United States Patent [19]
Herrmann

[11] Patent Number: 5,631,963
[45] Date of Patent: May 20, 1997

[54] CIRCUIT ARRANGEMENT FOR THE RECOGNITION OF ADJACENT CHANNEL INTERFERENCE

[75] Inventor: Matthias Herrmann, Hildesheim, Germany

[73] Assignee: Blaupunkt-Werke GmbH, Hildesheim, Germany

[21] Appl. No.: 331,762

[22] Filed: Oct. 31, 1994

[30] Foreign Application Priority Data

Nov. 12, 1993 [DE] Germany .................. 43 38 700.4

[51] Int. Cl.[6] ...................................... H04H 5/00
[52] U.S. Cl. ........................ 381/13; 455/295; 455/306
[58] Field of Search .................... 381/13, 4, 3; 455/295, 455/303, 306, 307, 309, 312, 296

[56] References Cited

U.S. PATENT DOCUMENTS

| | | |
|---|---|---|
| 4,356,568 | 10/1982 | Ogita . |
| 5,204,904 | 4/1993 | Carver et al. .................. 381/13 |

FOREIGN PATENT DOCUMENTS

| | | |
|---|---|---|
| 0449199 | 10/1991 | European Pat. Off. . |
| 3721918 | 11/1988 | Germany . |
| 4311933 | 10/1994 | Germany . |
| 4309518 | 10/1994 | Germany . |

*Primary Examiner*—Forester W. Isen
*Attorney, Agent, or Firm*—Kenyon & Kenyon

[57] ABSTRACT

A circuit arrangement for recognizing adjacent channel interference in a stereo radio receiver, in which a stereo multiplex signal is present. An adjacent channel interference signal is obtained as a function of a direct voltage portion of the stereo multiplex signal and as a function of the spectral components of the stereo multiplex signal above 60 kHz.

18 Claims, 5 Drawing Sheets

CIRCUIT ARRANGEMENT FOR THE RECOGNITION OF ADJACENT CHANNEL INTERFERENCE

FIELD OF THE INVENTION

The present invention relates to a circuit arrangement for recognizing adjacent channel interference in a stereo radio receiver in which a stereo multiplex signal is present. More particularly, the present invention relates to a circuit for reducing the subjectively felt disturbing effect of adjacent channel interference.

BACKGROUND INFORMATION

Signals from adjacent channels can lead to interference in a receiving channel in the case of ultra-short-wave reception due to insufficient filtration in the high-frequency preliminary stages and in the intermediate frequency level. The object of the present invention is to recognize such interference, utilizing digital circuits, and more preferably utilizing an integrated circuit technique. Another object of the present invention is to reduce the subjective disturbing effect of adjacent channel interference.

SUMMARY OF THE INVENTION

In the circuit arrangement of the present invention, the recognition of adjacent channel interference is realized by a signal which indicates the disturbing channel interference ("adjacent channel interference") that is obtained as a function of a direct voltage portion and as a function of spectral components above 60 kHz.

By the use of two criteria for the recognition of adjacent channel interference according to the circuit arrangement of the present invention, a differentiation is possible between adjacent channel interference and other types of interference which also lead to spectral components of higher frequency in the stereo multiplex signal. Such other type of interference are, for example, multiple channel reception or ignition interference.

Although other signals can be obtained as adjacent channel interference within the scope of the present invention, obtaining a binary signal which characterizes only the existence or non-existence of adjacent channel interference is particularly advantageous in many cases for further processing.

In a preferred embodiment of the circuit arrangement according to the present invention, a first auxiliary signal is formed when the direct voltage portion of the stereo multiplex signal is greater than a first reference value. A second auxiliary signal is formed when the amplitudes of the spectral components above 60 kHz of the stereo multiplex signal are greater than a second reference value. The first and second auxiliary signals are combined by an AND function in order to form an adjacent channel interference signal.

Advantageous developments of the circuit arrangement according to the present invention include that the first auxiliary signal is obtained by the stereo multiplex signal being filtered through a low-pass filter and rectified, and the rectified signal then being compared with a first reference value. The second auxiliary signal is obtained by the stereo multiplex signal being passed through a high-pass filter, rectified and then passed through a low-pass filter. The signal which passed through the low-pass filter is then compared with a second reference value.

A reduction in the subjectively felt disturbing effect with the aid of the adjacent channel interference signal can be obtained by a damping of the audio signals by, for instance, 10 dB to 20 dB. One particularly advantageous possibility for reducing the disturbing effect, however, includes feeding the adjacent channel interference signal into an integrator which integrates in one direction when adjacent channel interference is present, and integrates in the opposite direction when adjacent channel interference is not present. The output signal of the integrator effects a damping of audio signals obtained from the stereo multiplex signal in the manner that the damping increases upon integration in the opposite direction.

In a preferred embodiment of the circuit arrangement according to the present invention, the duration of adjacent channel interference is taken into account in advantageous manner. In particular, it is advantageous for the time constant of the integrator in the one direction to be less than in the opposite direction, or equal to zero. In order to avoid too strong a damping, the output signal of the integrator is conducted over a limiter.

Another preferred embodiment of the circuit arrangement according to the present invention includes that, in the case of the derivation of further signals representing the quality of reception, the adjacent channel interference signal is superimposed on said signals and that the signal resulting therefrom is then limited.

DETAILED DESCRIPTION OF THE INVENTION

Figure 1:
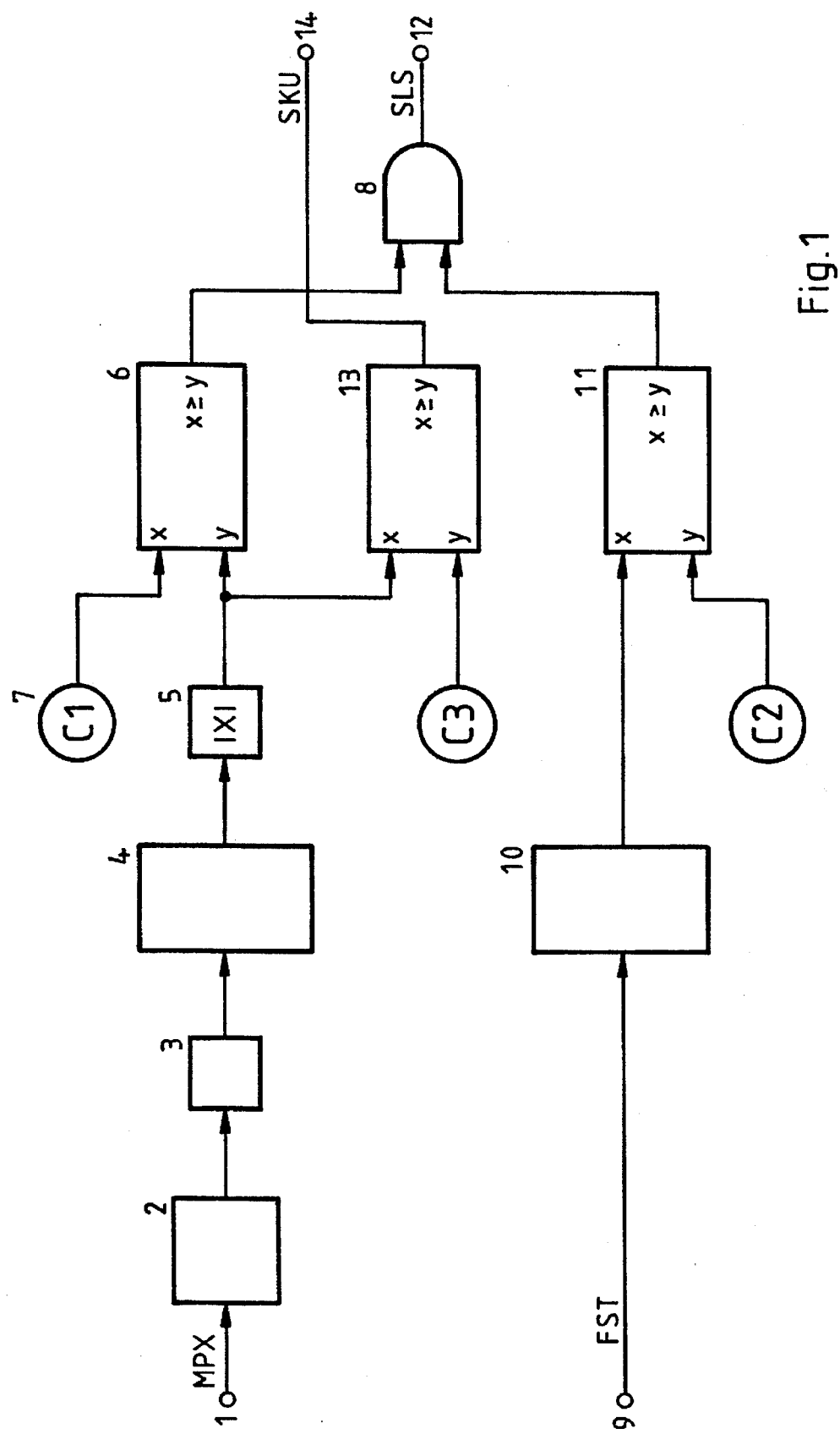
FIG. 1 shows a block diagram for obtaining a first auxiliary signal in a circuit arrangement according to the present invention.

In the figures, identical parts have the same reference numerals. The circuit arrangement of the present invention can be developed in various embodiments. Thus, for instance, the blocks shown can include suitable circuits, particularly integrated circuits. In the case of a very high degree of integration, it is furthermore possible to effect the entire digital signal processing of the receiver in one integrated circuit. In this case, signal processing steps such as, for instance, filtrations or non-linear weightings, are effected by arithmetic operations. In order to produce a receiver having the circuit arrangement of the present invention, digital signal processors and other digital circuits such as, for instance, shift registers, flip-flops, etc. can also be arranged together within an integrated circuit.

The circuit arrangement of the present invention shown in FIG. 1 provides not only for obtaining a stop signal for the station finder, which is described in the Applicant's German Patent Application No. 43 11 933.6, but also for obtaining a first auxiliary signal SKU. At input 1 there is fed a stereo multiplex signal MPX having a scanning rate of 228 kHz which has been found advantageous in the preceding digital signal processing.

Since a substantially lower scanning rate is sufficient to form the first auxiliary signal SKU, the stereo multiplex signal MPX is conducted over a low-pass filter 2 to a (decimation) circuit 3 to reduce the scanning rate by a factor of twenty-four.

The resultant signal is fed to another low-pass filter 4, the cut-off frequency of which is very low so that essentially only the direct voltage portion is present at its output, the amount of which is determined in accordance with (an absolute value generation) circuit 5. This amount is compared in a comparator 6 with a constant C1, fed at input 7, for instance 0.07 (referred to as the maximum amplitude). If the amount of the direct voltage portion is less than the constant C1, a 1 appears at the output x≧y of the comparator 6 and is fed to an input of an AND circuit 8.

A signal FST which corresponds to the field strength of the signal received at the time is fed to a further input 9 of the circuit arrangement of the present invention shown in FIG. 1. This signal is filtered in the low-pass filter 10 and compared at 11 with a constant C2. If the field strength is greater than a value predetermined by the constant C2, then a 1 appears at the output x≧y of the comparator 11, it also being fed to the AND circuit 8. If both conditions are satisfied, then the stop signal SLS at the output 12 of the AND circuit 8 also assumes the level 1.

For obtaining the first auxiliary signal SKU, a further comparator 13 is added, to which a constant C3 is fed as reference value. If the direct voltage portion fed by the (absolute value generation) circuit 5 is greater than or equal to C3, then the first auxiliary signal SKU at the output 14 assumes the level 1.

Figure 2:
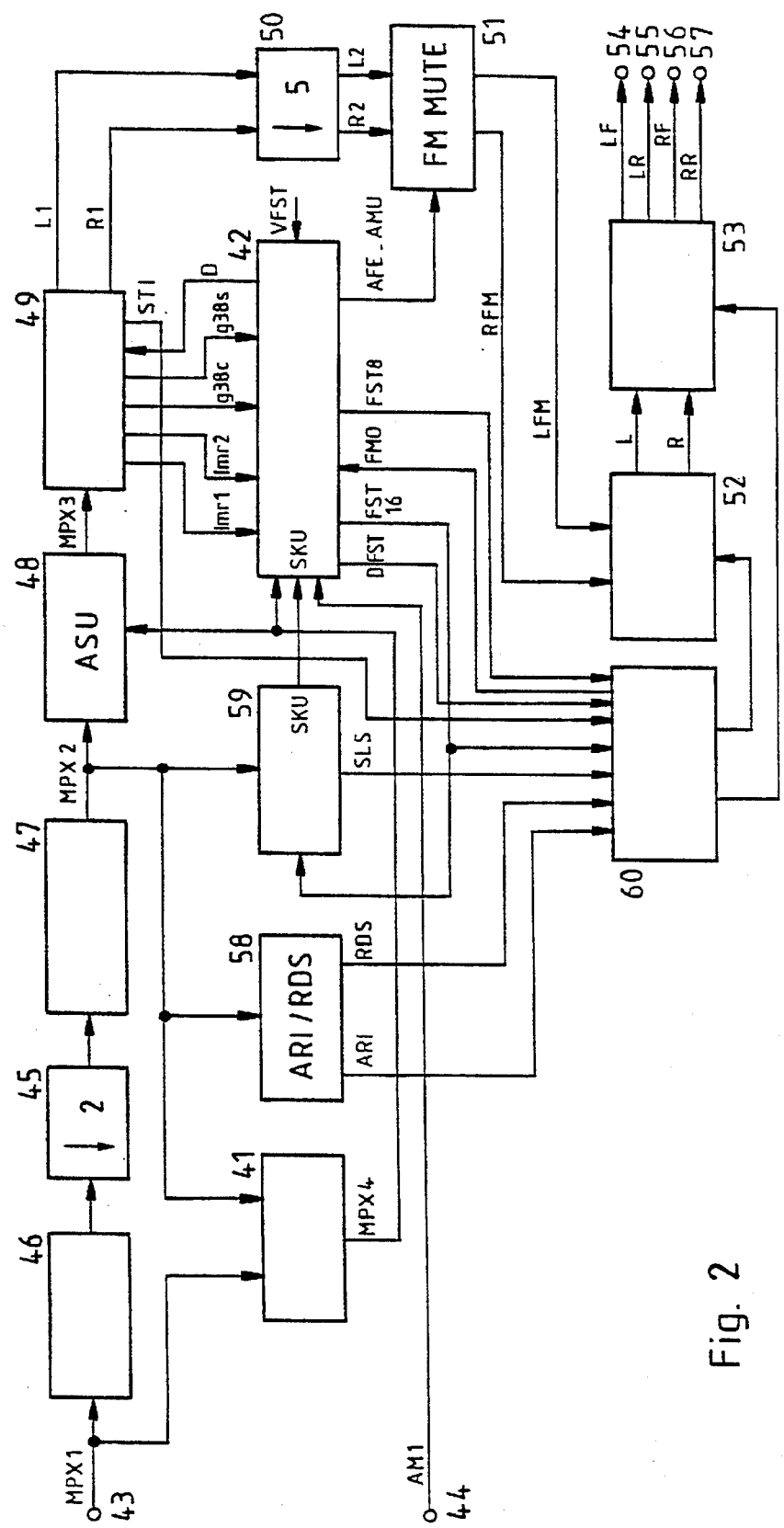
FIG. 2 is a block diagram of a highly integrated stereo radio receiver having a circuit arrangement according to the present invention.

FIG. 2 shows the processing of a multiplex signal MPX1 into audio signals for four channels. A digital stereo multiplex signal MPX1 is fed to an input 43 by an FM demodulator, while the signal AM1 is received by the input 44 from an AM demodulator. The scanning rate of the signal MPX1 is 456 kHz, which is an integral multiple of the carrier frequency of the radio data signal (57 kHz).

However, this high scanning frequency requires a large number of arithmetic operations per second. In the case of the radio receiver shown in FIG. 2, it is desirable to operate with the lowest possible scanning rates which are adapted to the bandwidth of the signal in question. Therefore the signal MPX1 is subjected at (decimation circuit) 45 to a halving of the scanning rate, for which a low-pass filtering 46 is first necessary. However, a low-pass filter having a linear frequency response over the greatest part of the pass range and a steep drop in the region of half the scanning frequency is very expensive, so a low-pass filter 46 having a gradual drop is used. A compensation filter 47 having an opposite frequency response, however, counteracts the error produced thereby.

The signal MPX2 with a scanning frequency of 228 kHz is fed to a circuit 48 for automatic noise suppression. Such circuits suppress short pulse-like interference and have become known by the abbreviation ASU. The output signal MPX3 of the automatic noise suppression circuit 48 passes into a stereo decoder 49 which produces the two audio signals L1 and R1 (left and right), which are subjected at (decimation) circuit 50 to a scanning rate conversion by division by five. The audio signals L2, R2 produced thereby are fed, via a circuit 51 with controllable damping, as signals LFM and RFM to inputs of a source switch 52. In a manner not shown in the drawing, other audio signals can be fed to the source switch, for instance from a CD player or a tape player.

The output signals of the source switch 52 pass as signals L, R to an audio processor 53, by means of which adjustments such as, for instance, volume, automatic gain control, balance and treble and bass lowering or raising are effected. The audio processor 53 has four outputs 54, 55, 56, 57 from which the signals LF or LR, RF and RR can be fed in each case to an output stage (not shown) for four loudspeakers.

The stereo multiplex signal MPX2 furthermore passes to a decoder 58 for communication signals and/or radio-data signals. Furthermore, the signal MPX2 is required by a circuit 59 for the station-finder stop and the first auxiliary signal SKU, for which one preferred embodiment of this circuit has been described in connection with FIG. 1.

A control unit 60 receives signals from the circuits 58, 59 and 42 as well as from the stereo decoder 49. It gives off signals to the circuit 42, the source switch 52, and the audio processor 53. Further connections of the control unit 60—for instance to operating and display devices—are not shown in FIG. 2.

For obtaining the second auxiliary signal, a signal is required which consists of the portions of the stereo multiplex signal above 60 kHz. It is produced in a circuit arrangement 41 to which the signals MPX1 and MPX2 are fed. One embodiment of the circuit 41 is described in further detail in German Patent Application No. P 43 09 518.6, together with other details of the block diagrams of FIGS. 2 and 3.

Figure 3:
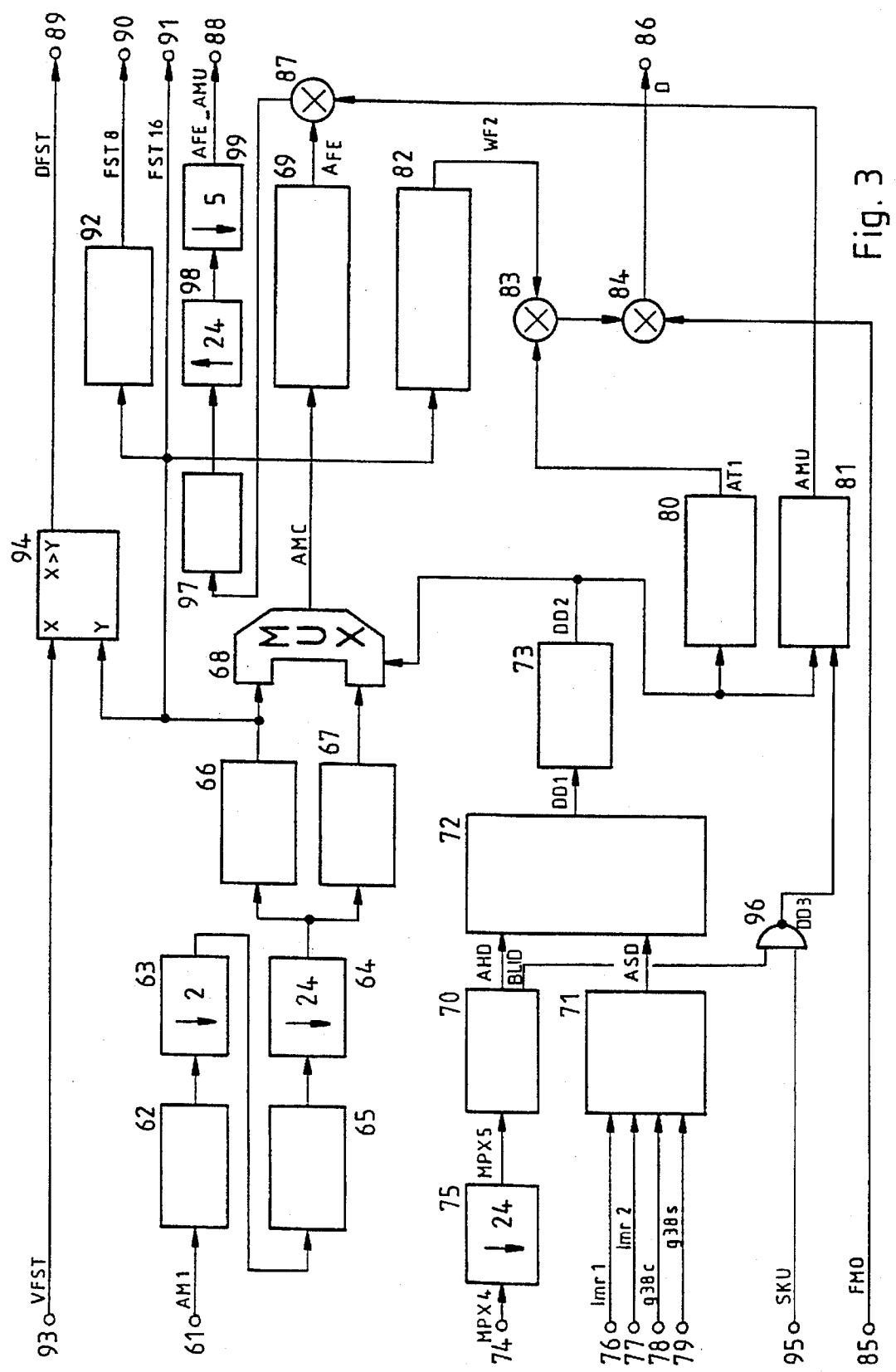
FIG. 3 shows a part of the block diagram of FIG. 2 in greater detail.

FIG. 3 shows details of the circuit 42, shown in FIG. 2, for obtaining signals which describe the quality of the signals received. At input 61, the output signal AM1 of an amplitude modulator (not shown) is fed. It serves as measure of the field strength. The signal AM1 having a scanning frequency of 456 kHz is first subjected to low-pass filtration in a filter 62. Filter 62, together with comb filter 65, prevents the forming of high-frequency spectral components on the direct portion upon the subsequent sub-scanning by the factor of two at (decimation circuit) 63 and subsequently by the factor of twenty-four at (decimation circuit) 64 and thereby impermissibly falsifying it. Low-pass filtration comb filter 65 is provided between the scanning members 63 and 64.

The field strength signal which is thus decimated with respect to the scanning rates experiences an averaging with different time constants in two low-pass members 66, 67. As a function of a signal DD2, a changeover switch 68 conducts one of the output signals of the low-pass members 66, 67 further as signal AMC. This signal is weighted at 69 in the form a noise curve for producing the noise damping $A_{FE}$. The field-strength signal of the smaller time constant, and therefore the "fast" field strength signal FST16, at the output of the low-pass member 66 serves, furthermore, to reduce the stereo channel separation D upon decrease of the field strength. The further processing of the signals $A_{FE}$ and FST16 is explained in the Applicant's German Patent Application No. 43 09 518.6.

Figure 4:
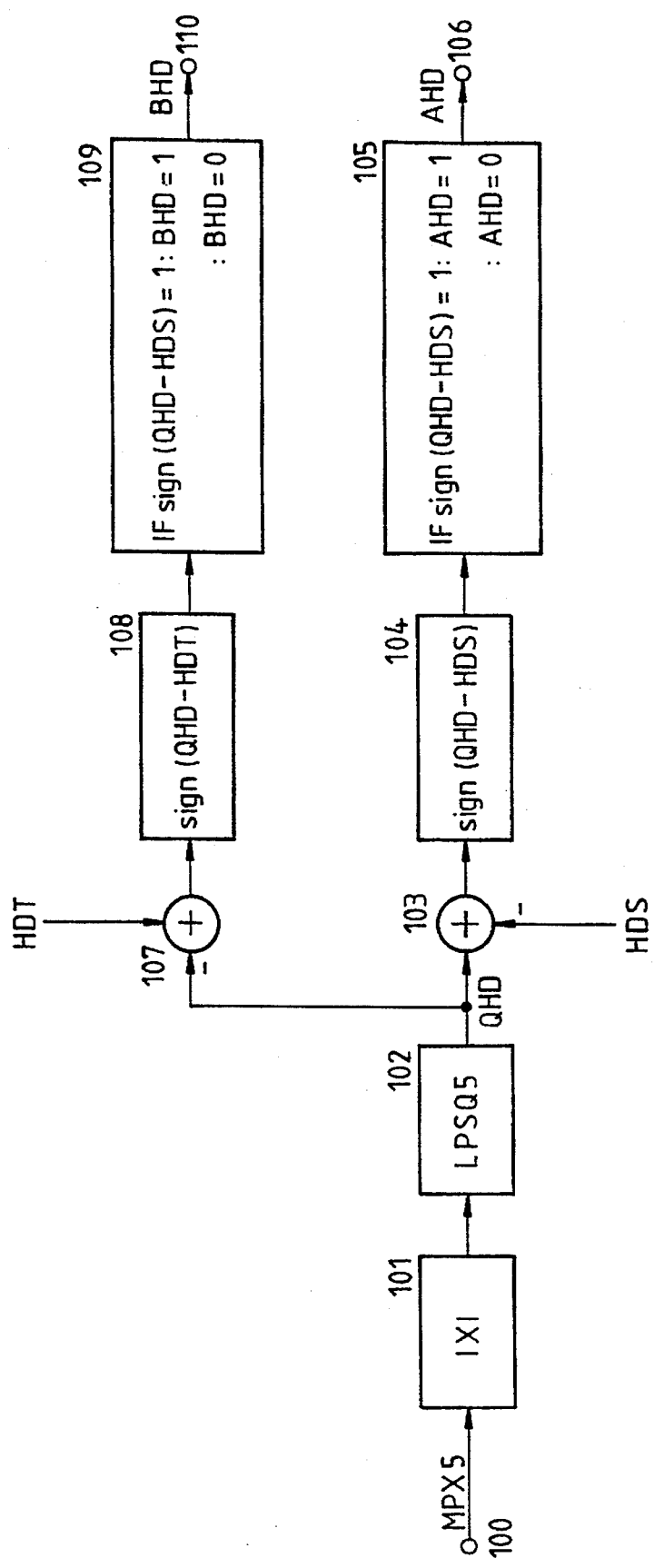
FIG. 4 is a block diagram of a circuit arrangement according to the present invention for obtaining a second auxiliary signal.

A signal MPX5, which contains portions of the stereo multiplex signal above 60 kHz which are already transformed into the baseband, is fed, via an input 74 and a (decimation circuit) 75 to the high-pass detector 70 which is explained in detail in FIG. 4. The high-pass detector 70, a symmetry detector 71, and a logical network 72 provide an output signal DD1 which is conducted over a pulse width discriminator 73 to thereby produce the signal DD2.

In the high-pass detector 70, the second auxiliary signal BHD is placed at the level 1 when spectral components above 60 kHz are present. This second auxiliary signal BHD is fed, together with the first signal SKU fed at 95 to a NAND circuit 96, as a result of which the adjacent channel interference signal DD3 is formed, which assumes the level 0 in the case of adjacent channel interference. This signal is fed to an input of an integrator 81.

Another output signal AHD of the high-pass detector 70 assumes the value 1 when the amplitudes of signal portions above 60 kHz lie above a threshold value. This has the fundamental advantage of reacting very promptly to all types of interference—and therefore also to interference other than multichannel interference. However, in the extreme case, it can have the result that an interference is reported which, however, does not yet lead to any audible disturbance in the output LF signal of the receiver. Nevertheless, in this case the measures provided in order to mask interference are introduced.

In order to recognize audible interference which is not adjacent channel interference, an evaluation is made of the symmetry of the carrier-frequency stereo-difference signal. It is essential in this process, on the one hand, that an undisturbed signal must, on the basis of the double sideband amplitude modulation, be symmetrical to the carrier and, on the other hand, that the desired signal be directly considered here. Asymmetry, therefore, leads to the conclusion that interference which is audible in the LF signal is present. Via inputs 76 to 79, there are fed to the symmetry detector 71 by a stereo decoder, shown in FIG. 2, signals which essentially represent the product of the carrier-frequency stereo-difference signal with a reference carrier which is quadrature to the auxiliary carrier. The output signal ASD of the symmetry detector assumes the value 1 when asymmetry is present.

In many cases, the use of one of the signals AHD or ASD as further signal DD2 results in considerable advantages. In the preferred embodiment of the present invention shown, however, both detectors 70, 71 are provided, the output signals AHD and ASD being conducted over a logical network 72. This has the advantage, on the one hand, that in the case of pure mono transmission in which no carrier-frequency stereo difference signal is sent out, obtaining the further auxiliary signal DD2 is effected by the high-pass detector 70. Similarly, obtaining the further signal DD2 is possible also in methods of stereo signal transmission differing from the European Standard, for instance in the FMX method in the USA.

Figure 5:
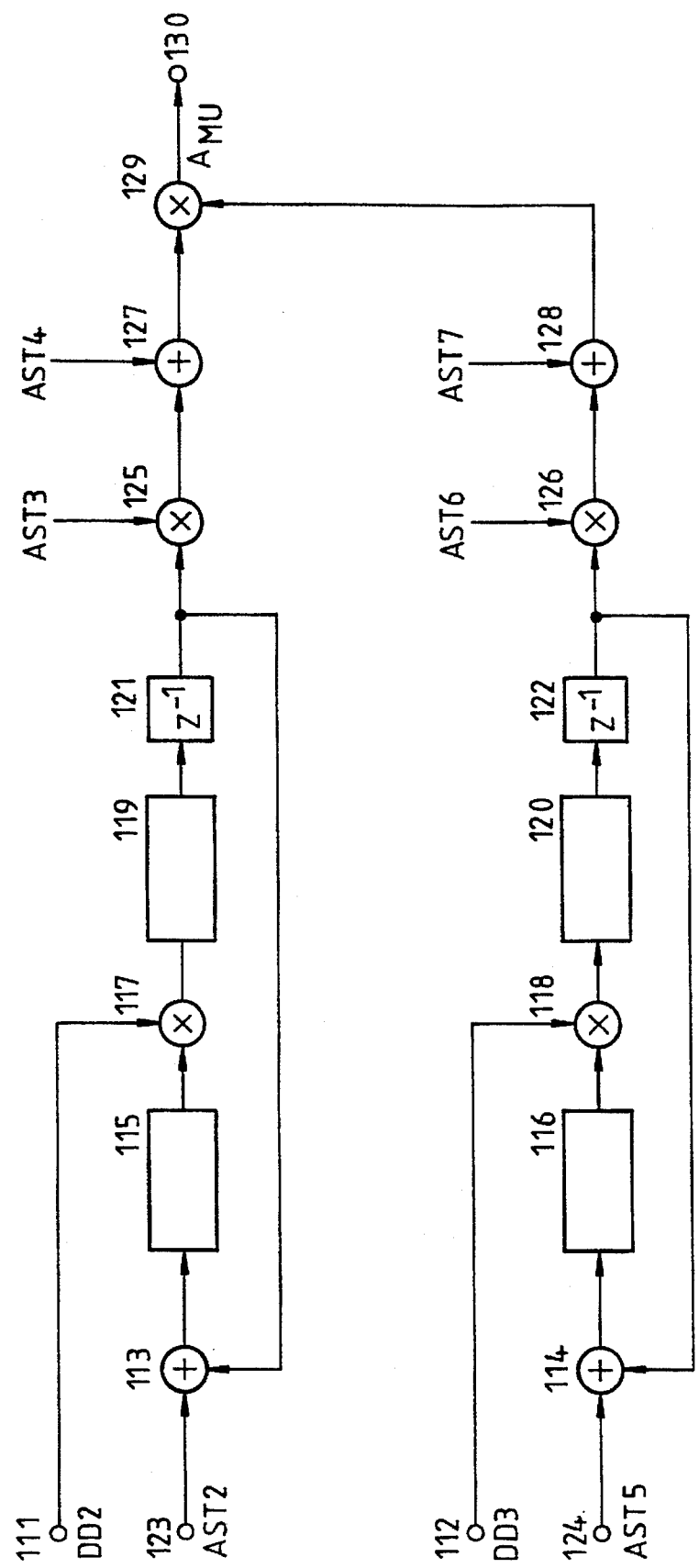
FIG. 5 is a block diagram of a circuit arrangement according to the present invention for forming a stereo signal for damping audio signals from an adjacent channel interference signal and another signal.

The logical network permits the selection or nature of the logical function of the two signals AHD and ASD with inspect to the signal DD1. The signal DD1 is conducted over a pulse-width discriminator 73 which sees to it that the output signal DD2 only indicates interference when the input signal DD1 is active for an adjustable minimum period of time. As already mentioned, the signal DD2 switches between a large and a small time constant in connection with the formation of the field strength signal. Furthermore, the signal DD2 serves as trigger signal for two asymmetric integrators 80, 81, one preferred embodiment of which is shown in FIG. 5.

The output signals AT1 and AMU of the asymmetric integrators 80, 81 jump, at the time of the triggering, to 0 or to a preset value between 0 and 1 and remain at these values as long as DD2 and DD3 are at 0, in order to increase linearly with adjustable time constants to a maximum value. The signal AT1 is fed jointly with the field strength signal WF2 weighted at circuit 82 to a multiplier 83. In this way there is formed a signal which effects a masking of interference in the LF signal by a reduction in the stereo channel separation. This signal is multiplied in a further multiplier 84 by a signal FMO, fed at input 85, which serves for the necessary elimination of the stereo channel separation. The signal D can be taken from the output 86 and fed to the stereo decoder.

The output signal AMU of the asymmetric integrator 81 is fed, together with the signal $A_{FE}$, to a further multiplier 87, as a result of which, after limiting at 97 and scanning rate conversion at (decimation circuits) 98 and 99, a signal AFE_AMU is produced which effects a damping of the LF signal by at most the value predetermined by the limiter 97, which value can be taken from the output 88.

Information regarding the field strength in a digital radio receiver is required at several places. For this purpose, the circuit arrangement of FIG. 3 has three further output 89, 90, and 91 at which signals can be obtained which describe the field strength. The signal FST16 is precisely 16 bits. For many purposes, however, a signal of lower accuracy is sufficient and therefore a field-strength signal FST8 having a bit width of 8 is produced by means of a compression characteristic curve circuit 92.

The signals FST16 and FST8 are sufficiently fast for the purpose of recognition of the signal quality, but they are not free of a certain inertia due to the filters described in connection with FIG. 3, and possibly the amplitude demodulation. A signal VFST can be fed via an input 93 from a microcontroller, not shown. From this signal and the signal FST16 there is produced, by means of a comparator 94, a signal DFST the level of which, either 0 or 1, depends on whether the signal VFST or the signal FST16 is the greater. In this way, the signal DFST obtained at the output 89 shows the change in direction of the field strength.

The high-pass detector 70 will be described in further detail below with reference to FIG. 4. The signal MPX5, which is averaged in accordance with an absolute value generation circuit 101 with the aid of a low-pass filter 102, can be fed to an input 100 of the high-pass detector of FIG. 4. If the averaged signal exceeds a threshold HDS, then the output signal of a comparator consisting of a subtracter 103 and a sign recognition (circuit) 104, 105 assumes the value 1. The signal AHD at the output 106 also assumes the value 1 when the sign of the output signal of the subtracter 103 is positive. Another comparator is formed by another subtracter 107 and another sign-recognition (circuit) 108, 109. The second auxiliary signal BHD at the output 110 assumes the value 1 when the higher-frequency spectral portions exceed the reference value HDT.

One preferred embodiment of the asymmetric integrator 81 according to the present invention is shown in FIG. 5. In this case, there are two integrators to which the signals DD2 and DD3 can be fed via inputs 111 and 112, respectively. In each case, each integrator consists of, respectively, an adder 113,114, two format converters 115, 116 and 119, 120, a multiplier 117, 118 and a one scanning period delay 121, 122. At inputs 123 and 124, integration constants AST2 and AST5 are fed, respectively. At the start of adjacent channel interference, the signal DD3 changes to the value 0. This has the result that the integrator for the adjacent channel interference signal DD3 is set at 0. The integrator retains this output value as long as adjacent channel interference is present, i.e. as long as DD3 is 0.

At the end of adjacent channel interference, DD3 again assumes level 1, whereupon the integrator rises to the value 1 due to the integration of the constant AST5. A similar procedure is effected with the signal DD2. The output signals of the two integrators are each weighted at multipliers 125, 126 with a constant AST3, AST6, respectively, and then each result added at 127, 128 to another constant AST4, AST7, respectively. The results are multiplied by each other at multiplier 129 and can be taken from an output 130 as signal $A_{MU}$.

What is claimed is:

1. A circuit arrangement for recognizing adjacent channel interference in a stereo radio receiver in which a stereo multiplex signal is present, comprising a circuit for obtaining an adjacent channel interference signal as a function of a direct voltage portion of the stereo multiplex signal and as a function of spectral components of the stereo multiplex signal above 60 kHz.

2. A circuit for recognizing adjacent channel interference in a stereo radio receiver including a stereo multiplex signal, comprising:
   a first circuit portion for generating a first auxiliary signal based on a direct voltage portion of the stereo multiplex signal;
   a second circuit portion for generating a second auxiliary signal based on at least one spectral component of the stereo multiplex signal being above a predetermined frequency; and
   a third circuit portion for combining the first auxiliary signal and the second auxiliary signal to generate an adjacent channel interference signal indicating adjacent channel interference in the stereo radio receiver.

3. The circuit according to claim 2, wherein the predetermined frequency is 60 kHz.

4. The circuit according to claim 2, wherein the first circuit portion compares the direct voltage portion with a first reference value, thereby forming the first auxiliary signal which indicates when the direct voltage portion is greater than the first reference value, wherein the second circuit portion detects when an amplitude of the at least one spectral component exceeds a second reference value, thereby forming the second auxiliary signal which indicates when the amplitude of the at least one spectral component exceeds the second reference value, and wherein the third circuit portion includes an AND circuit having the first auxiliary signal as a first input, the second auxiliary signal as a second input, and the adjacent channel interference signal as an output.

5. The circuit according to claim 4, wherein the at least one spectral component of the stereo multiplex signal is above 60 kHz.

6. The circuit according to claim 4, wherein the first circuit portion includes:
   at least one low pass filter for filtering the stereo multiplex signal to provide a first filtered signal;
   at least one rectifier coupled to the at least one low pass filter for rectifying the first filtered signal to provide a first rectified signal; and
   at least one comparator being coupled to the at least one rectifier for comparing the first rectified signal with the first reference value.

7. The circuit according to claim 4, wherein the second circuit portion includes:
   at least one high pass filter for filtering the stereo multiplex signal to provide a second filtered signal;
   at least one rectifier coupled to the high pass filter for rectifying the second filtered signal to provide a second rectified signal; and
   at least one low pass filter for filtering the second filtered signal to provide a third filtered signal;
   at least one comparator being coupled to the at least one low pass filter for comparing the third filtered signal with the second reference value.

8. A circuit for recognizing adjacent channel interference in a stereo radio receiver including a stereo multiplex signal, comprising:
   a first circuit portion for generating a first auxiliary signal based on a direct voltage portion of the stereo multiplex signal;
   a second circuit portion for generating a second auxiliary signal based on at least one spectral component of the stereo multiplex signal being above a predetermined frequency;
   a third circuit portion for combining the first auxiliary signal and the second auxiliary signal to generate an adjacent channel interference signal indicating adjacent channel interference in the stereo radio receiver and
   at least one integrator having at least one input signal and an output signal, the adjacent channel interference signal being one of the at least one input signal, the at least one integrator integrating in one direction when the adjacent channel interference signal has a first value and integrating in an opposite direction when the adjacent channel interference signal has a second value, the at least one integrator output signal providing for damping of audio signals obtained from the stereo multiplex signal so that the damping increases upon integration in the opposite direction.

9. The circuit according to claim 8, wherein the at least one integrator has a first time constant in the one direction and a second time constant in the opposite direction.

10. The circuit according to claim 9, wherein the first time constant is less than the second time constant.

11. The circuit according to claim 8, wherein the output signal is coupled to a limiter.

12. The circuit according to claim 11, further comprising at least one reception quality signal, the adjacent channel interference signal being superimposed on the at least one reception quality signal.

13. A method for recognizing adjacent channel interference in a stereo radio receiver including a stereo multiplex signal, comprising the steps of:
   generating a first auxiliary signal based on a direct voltage portion of the stereo multiplex signal;
   generating a second auxiliary signal based on at least one spectral component of the stereo multiplex signal being above a predetermined frequency; and
   combining the first auxiliary signal and the second auxiliary signal to form an adjacent channel interference signal indicating adjacent channel interference in the stereo radio receiver.

14. The method according to claim 13, wherein the predetermined frequency is 60 kHz.

15. The method according to claim 14, wherein the generating a first auxiliary signal step includes comparing the direct voltage portion with a first reference value so that the first auxiliary signal indicates when the direct voltage portion is greater than the first reference value, wherein the generating a second auxiliary signal step includes detecting when an amplitude of the at least one spectral component is greater than a second reference value so that the second auxiliary signal indicates when the amplitude of the at least one spectral component exceeds the second reference value, and wherein the combining step includes providing the first auxiliary signal and second auxiliary signal as inputs to an AND circuit having the adjacent channel interference signal as an output.

16. The method according to claim 15, wherein the generating a first auxiliary signal step further includes filtering the stereo multiplex signal through at least one low pass filter to provide a first filtered signal, rectifying the first filtered signal to provide a first rectified signal, and comparing the first rectified signal with the first reference value.

17. The method according to claim 15, wherein the generating a second auxiliary signal step further includes filtering the stereo multiplex signal through at least one high pass filter to provide a second filtered signal, rectifying the second filtered signal to provide a second rectified signal, filtering the second rectified signal through at least one low pass filter to provide a third filtered signal, and comparing the third filtered signal with a second reference value.

18. A method for recognizing adjacent channel interference in a stereo radio receiver including a stereo multiplex signal, comprising the steps of:

generating a first auxiliary signal based on a direct voltage portion of the stereo multiplex signal;

generating a second auxiliary signal based on at least one spectral component of the stereo multiplex signal being above a predetermined frequency;

combining the first auxiliary signal and the second auxiliary signal to form an adjacent channel interference signal indicating adjacent channel interference in the stereo radio receiver; and integrating the adjacent channel interference signal via an integrator having at least one input signal and an output signal, the adjacent channel interference signal being an input signal, the at least one integrator integrating in one direction when the adjacent channel interference signal has a first value and integrating in an opposite direction when the adjacent channel interference signal has a second value, the at least one integrator output signal providing for damping of audio signals obtained from the stereo multiplex signal so that the damping increases upon integration in the opposite direction.

* * * * *